United States Patent Office 3,084,809
Patented Apr. 9, 1963

3,084,809
BUFFER FOR RAIL VEHICLES
Giulio Lucchese, Milan, Italy, assignor to Società Applicazioni Gomma Antivibranti S.A.G.A., S.p.A., Milan, Italy
Filed May 19, 1960, Ser. No. 30,357
Claims priority, application Italy May 29, 1959
4 Claims. (Cl. 213—220)

This invention relates to buffers for rail vehicles of the type including a headed cylinder slidable telescopically in a tubular casing and a compound system, including resilient and friction means, acting between the bottom of the casing and cylinder in order to brake the relative movement of the latter in operation when an axial thrust is applied upon the buffer.

A first object of this invention is that of providing a buffer of the above specified type, which will be silent and safe in operation, will have a simple structure and will be able to absorb satisfactorily thrusts and shocks of widely variable character. A great part of buffers employed at present are able to absorb efficiently substantial shocks, while they behave rigidly in the event of shocks or thrusts of reduced entity; as these latter happen continuously during the normal run of a railway train, they become quickly annoying for the travellers unless promptly absorbed.

A further object of this invention is that of providing in a buffer of the afore specified type an original frictional damping unit which will work longtime without substantial wear and will operate progressively and silently.

According to a general characteristic of this invention, a buffer of the above specified type is characterized in that the said compound system includes two coaxial piston members in a mutual telescopic engagement defining jointly with the cylinder an annular cavity; a hard rubber ring in said annular cavity, the circumferential outer surface of said ring being substantially out of frictional engagement with the cylinder, but being capable of frictionally engaging the cylinder at a mutual approach of the piston members; resilient compression means operative between one of the piston members and the head end of the cylinder; and resilient compression means operative between the other piston member and the bottom of the casing the last mentioned resilient means being less yielding than the first mentioned resilient means.

In an advantageous embodiment of this invention the hard rubber ring consists of a synthetic nitrile rubber having a hardness of about 85 Shore.

Figure 1:
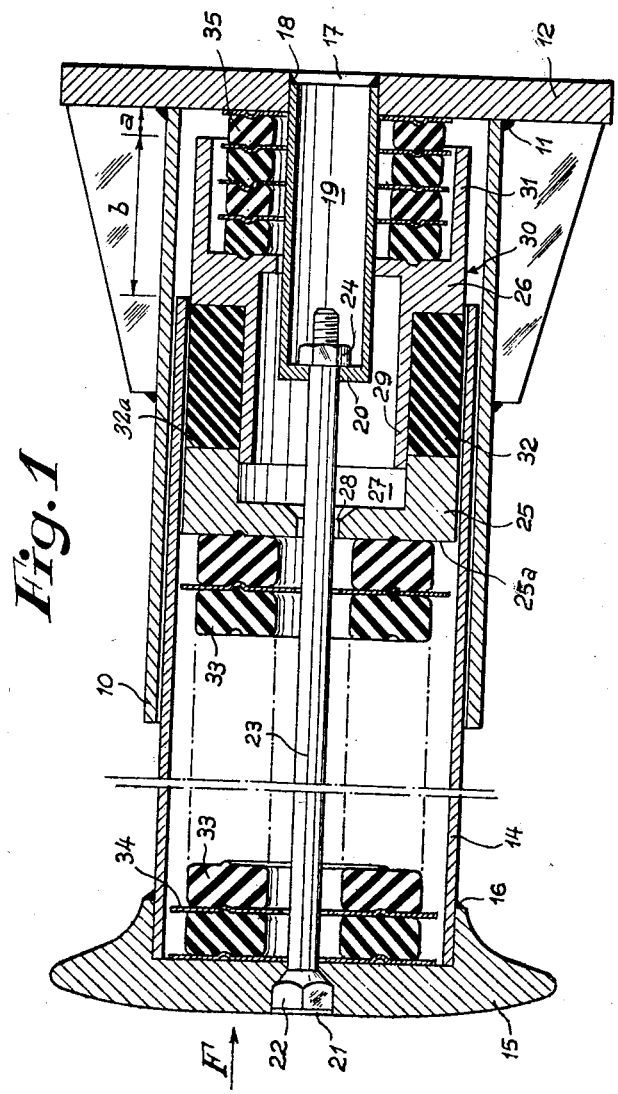
Figure 2:
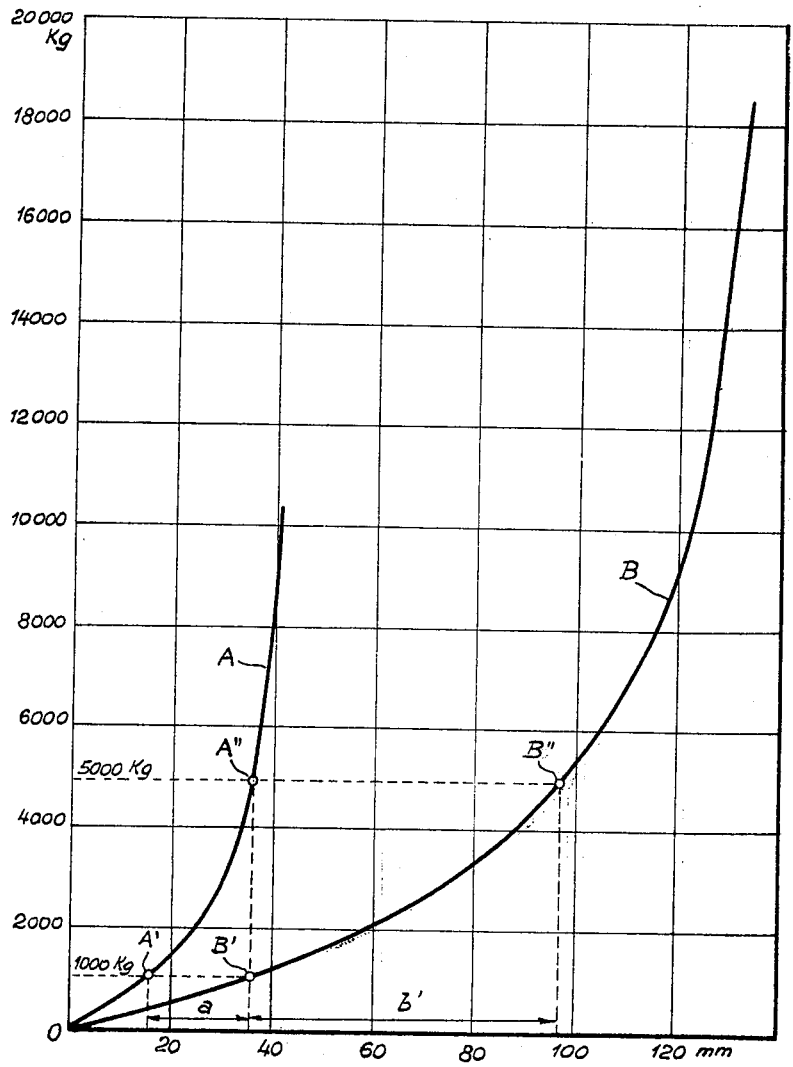

Further features and advantages will be apparent from the following description in which reference is made to the accompanying drawing wherein:

FIGURE 1 is a longitudinal sectional view of a preferred embodiment of this invention, and FIGURE 2 is an explanatory diagram relating to the embodiment shown on FIGURE 1.

Referring first to FIGURE 1, there is indicated by 10 a cylindrical tubular metal casing, one end of which is welded at 11 to a solid bottom plate 12 perpendicular to the axis of the casing.

A cylinder 14 is telescopically slidable in the casing one end section of which protrudes outwardly from the casing and has a head 15 welded at 16 to the cylinder.

The plate 12 has a central aperture 17 to which the rear end of a rigid tubular member 19 is welded at 18, the front end of the member 19 being closed by a centrally bored bottom 20. The tubular member 19 has a diameter appreciably smaller than that of the casing 10 and extends within the casing from the bottom plate 12 towards the head 15. The latter presents a central seat 21 in which a polygonal head 22 of a bolt 23 is seated; the opposite end of the bolt 23 extends through the aperture in the bottom 20 of the tubular member 19 and has screwed thereon a tightening nut 24 abutting the bottom 20 thereby to prevent the cylinder 14 of being wholly extracted from the casing 10. All parts specified above are of steel, as is usual in the art.

In the cavity enclosed by the cylinder 14 and casing 10 are coaxially arranged two piston members 25 and 26. The piston member 25 has a general shape of a cup, having its cylindrical cavity 27 turned towards the piston member 26 and towards the bottom plate 12. The circumferential surface of the piston member 25 is cylindrical and slides smoothly in the cylinder 14. The member 25 further has a central aperture 28 through which loosely extends the bolt 23. The piston member 26 includes a tubular forward section 29 of a reduced diameter, telescopically engaged with the curcumferential wall surface limiting the cavity 27 in the member 25. The body section of the piston member 26 has a circumferential surface 30 of a diameter equal to that of the circumferential surface of the piston member 25, whereby the piston member 26 too is capable of smoothly sliding in the cylinder 14. A rear section of the piston member 26 consists of a skirt 31 radially co-extensive with the piston body. It will be seen on the drawing that the latter is centrally bored and concentrical with the tubular member 19. It will be also seen that the two piston members 25, 26 define together with the cylinder 14 an annular cavity 32a of a rectangular cross-sectional shape accommodating a ring 32 of a complemental cross-sectional shape formed of a synthetic nitrile rubber having a hardness of 80–90 Shore. Considering the buffer in inoperating conditions shown on FIG. 1, the circumferential surface of the ring 32 is just slightly out of frictional engagement with the cylinder 14.

A synthetic rubber mix suitable for manufacturing the ring 32 is of a following composition:

| | Parts by weight |
|---|---|
| Nitrile rubber | 100 |
| Zinc oxide | 5 |
| Sulfur | 8 |
| Stearic acid | 5 |
| Kaolin | 80 |
| Accelerators | 1 |
| Coloring matter | 5 |

The piston member 25 exhibits towards the head 15 a face 25a which is substantially planar and perpendicular to the general axis of the buffer. A rubber compression spring of the type including a pile of rubber cakes 33 alternating with centrally apertured metal discs 34 is co-axially arranged between the surface 25a and the head 15. The pile is kept axially aligned owing to a mutual engagement of grooves and ribs on the cakes 33 and discs 34. Springs of this kind are known in the art. A similar compression spring 35 axially extends between the piston member 26 and the bottom plate 12, in the space surrounded by the skirt 31. The springs are axially precompressed by a common pre-stressing member consisting of the bolt 23 acting as a tie rod between the bottom section 12 and the head 15. It is to be noted that in conditions shown the free edge of the skirt 31 is spaced from the bottom plate 12 through a distance $a$. It is also to be noted that the hard rubber ring 32 is located within the longitudinal limits of the cylinder 14 and that the rear edge of the cylinder 14 is spaced through a distance $b$ from the free edge of the skirt 31. The value $a$ constitutes therefore the measure of the maximum axial yield of the spring 35 under a thrust F applied upon the buffer. The value $b$ constitutes the measure of the maximum axial yield of the spring 33, 34 inclusive of a relatively small axial yield of the ring 32.

It is also to be noted that the spring 35 includes only four rubber cakes, the spring 33—34 includes a considerable number of cakes 33, f.i. seventeen, so that the maximum yield value $b$ is several times greater than the value $a$.

The diagram of FIG. 2 relates to an embodiment of FIG. 1 wherein the values $a$ and $b$ are 20 mm. and 100 mm. respectively. The curves A and B are characteristic curves of the springs 35 and respectively 33, 34 showing the yields (plotted in millimeters on the axis of abscissae) of the springs in function of the loads (plotted in kgs. on the axis of ordinates). Said curves characterize therefore wholly the two springs.

The springs have been precompressed on assembly by a load of about 1000 kgs. by means of the tie rod 23. The points A' and B' show therefore the conditions of the springs in inoperative conditions of the buffer as shown on FIGURE 1.

The shape of the curves A and B shows clearly that the spring 35 (curve A) behaves more rigidly than the spring 33, 34 (curve B). It is also easy to note that in the whole working range of the buffer (loadings higher than 1000 kgs.), the flexibility of the spring 35 is never greater than the half flexibility of the spring 33, 34. It is specified for clarity that the flexibility is given by the incremental ratio $dS/dL$, wherein S indicates the yielding and L the load. It is further to note from the diagram of FIGURE 2 that in the space $a=20$ mm. the flexibility of the spring 35 quickly falls, so that in the point A" (representing the conditions wherein the skirt 31 stops against the bottom plate 12 in FIG. 1), this flexibility assumes a very small value, what is highly important for a perfect operation of the buffer, as will be seen hereinafter. On the contrary, the curve B shows that the flexibility of the spring 33, 34 reduces much less quickly, so that in the point B" said flexibility is still enough remarkable.

As to the hard rubber ring 32, its dimensions are so chosen that its outer circumferential surface will efficiently, frictionally engage the cylinder 14 in the event of relevant thrusts only. For simplicity it can be supposed that this frictional engagement starts at about 5,000 kgs. thrust. Generally the conditions for the intervention of the ring 32 can be adjusted at will by suitably selecting the volume and cross-section area and shape of the ring, without modifying the remaining components of the buffer. So, for example, a radial clearance can be provided between the ring and the section 29 of the piston member 26. Furthermore, the outer circumferential surface of the ring 32 could be barrel-shaped (instead of the illustrated cylindrical shape), so as to progressively establish a frictional engagement with the cylinder 14 when the piston members 25, 26 approach each other under the aciton of the thrust F.

It has been found that synthetic nitrile rubber of a hardness ranging between 80 and 90 Shore possesses excellent self lubricating and self smoothing properties, with a friction coefficient, relatively to the metal of the cylinder 14, amounting to about 0.2–0.3. In practice the wear of the ring 32 because of friction against the cylinder 14 proved to be nearly nil.

In order to explain the operation of the buffer described above let us suppose that a progressively increasing thrust F is applied on the head 15, while the bottom plate 12 is fastened in a known manner to a railway vehicle. As soon as the thrust F rises over 1,000 kgs. (which is a very low value in the case of railway vehicles) both springs 33, 34 and 35 respectively are compressed, the piston member 26 starts to recede over its path $a$ while the cylinder 14 starts to recede over its path $b$. The flexibility of the springs decreases with the increase of the thrust. When the thrust is reaching the 5,000 kgs. value, the free edge of the skirt 31 is closely adjacent the bottom plate 12 and, as shows the curve A on FIG. 2, the flexibility of the spring 35 is now reduced to such a degree that a further increase of the thrust causes the skirt 31 to abut the plate 12 with a hardly perceptible shock, which is comparable with a soft touch. At the moment the cylinder 14 has accomplished a part $b'$ (FIG. 2) of its stroke $b$ in respect of the piston member (26). For example with $a=20$ mm., $b=100$ mm. and $b'=60$ mm., it can be said that the cylinder 14 with its head 15 accomplishes an 80 mm. stroke in respect of the plate 12 and casing 10 while it is braked only by the sole opposing force of the springs 33, 34 and 35, said opposing force being progressively increasing.

Beginning from the thrust of 5,000 kgs., the piston member 26 is stopped by the plate 12 and at the same time the hard rubber ring 32 is axially compressed so that its outer circumferential surface starts frictionally engaging the inner cylindrical surface of the cylinder 14. Any further increase of the thrust F produces a further approach of the piston member 25 to the member 26 involving an increasing radial pressure of the ring 32 against the cylinder 14; on examining the run of the curve B beyond the point B" it will be seen that any such further small displacement of the cylinder 14 causes an appreciable increase of the load applied by the piston member 25 upon the ring 32, i.e. a considerable increase of the braking force exerted by the ring upon the cylinder sliding thereon.

Thrusts variable between 1,000 kgs. and 5,000 kgs. are absorbed by the springs 33, 34 and 35 only and the corresponding hysteresis heat is readily dissipated by the separating metal discs such as 34. It is consequently extremely improbable that the springs can become deteriorated on account of overheating. On the other side thrusts or shocks of higher entity requiring the intervention of the ring 32 are not so frequent, wherefore the ring 32 neither can become deteriorated on account of overheating, all the more the hard rubber employed for the ring excellently withstands both mechanical and thermal stresses.

It is further important to note that the springs 33, 34 and 35 although arranged "in series" are not to be confused with nor replaced by a single spring having suitable elasticity characteristics. Experimental tests have been conducted on a similar buffer, but wherein the piston member 26 was constantly abutting the bottom plate 12, i.e. wherein the spring 35 was omitted. It was found that in such conditions the return of the cylinder 14 to the inoperative position shown on FIG. 1 did not succeed at all, or it succeeded suddenly at an unexpected moment, probably on account of that the ring 32 when brought to a powerful frictional engagement with the cylinder 14 remained self-locked in such a condition thereby keeping locked the cylinder 14 in its receded condition until an outer perturbance or vibration caused a violent decompression of the ring 32 hence of the return spring 33, 34. Consequently the presence of the spring 35 seems to strongly influence the behaviour of the ring 32 by hindering its self-locking.

It is to be understood that the numerical values plotted on the diagram of FIG. 2 are merely illustrative and consequently they are not to be interpreted in a limitative sense, except for the hereinbefore mentioned relation between the flexibilities of the springs.

It is also to be understood that the conditions in which operation of the hard rubber ring 32 starts should not necessarily exactly correspond to that value of the thrust (5,000 kgs. in the described example) wherefore the skirt 31 comes into contact with the bottom plate 12.

It is however extremely advantageous to so design and correlate the components that an efficient substantial frictional engagement between the ring 32 and cylinder 14 does not occur before the skirt 31 abuts the plate 12; the simplest manner for obtaining this result consists in suitably designing the cross-sectional shape and volume of the ring 32 as has been mentioned hereinbefore so as to obtain the desired "tuning" relation between the characteristics of the ring, those of the two springs 33, 34 and 35, degree of axial precompression and the maximum yield $a$ of the spring 35. It is finally to be understood that the invention is not limited to the shapes or arrangements of the component elements shown on FIG. 1, exception being made for the limitations disclosed in the above description and included in the appended claims.

What I claim is:

1. Buffer for rail vehicles of the type including a headed cylinder telescopically slidable in a tubular casing, and a compound system including resilient and friction means acting between the bottom of the casing and the cylinder, in order to brake the mutual relative movement of the latter when an axial thrust is applied on the buffer, characterized in that the said system includes two coaxial piston members in a mutual telescopic engagement defining jointly with the cylinder an annular cavity; a hard rubber ring in said annular cavity, the circumferential surface of said ring being substantially out of frictional engagement with the cylinder, but being capable of frictionally engaging the cylinder at a mutual approach of the piston members; the said hard rubber consisting of a synthetic nitrile rubber having a hardness of 80 to 90 Shore; resilient compression means operative between one of the piston members and the head end of the cylinder; and resilient compression means operative between the other piston member and the bottom of the casing, the said last mentioned resilient means being less yielding than the first mentioned resilient means.

2. Buffer as claimed in claim 1 wherein the degree of yielding of the said last mentioned resilient means is limited by an extension on the respective piston member.

3. Buffer as claimed in claim 1, wherein the said last mentioned resilient means is arranged adjacent the bottom of the casing, and wherein the yield of the said means is limited by a tubular skirt on the respective piston member whereby the maximum stroke of the said respective piston member amounts to a fraction only of the maximum stroke of the cylinder in the housing.

4. Buffer as claimed in claim 2, wherein th flexibility of the said second mentioned resilient means does not exceed half the flexibility of the first mentioned resilient means and wherein the first and second mentioned resilient means are precompressed by a common precompressing member to a degree such that the yielding of the said second mentioned resilient means is stopped by the said extension when the flexibility of the said means is substantially reduced to a negligible value.

References Cited in the file of this patent

UNITED STATES PATENTS

| | | |
|---|---|---|
| 2,431,736 | Dath | Dec. 2, 1947 |
| 2,656,938 | Dath | Oct. 27, 1953 |
| 2,765,929 | Mulcahy | Oct. 9, 1956 |
| 2,781,135 | Spence et al. | Feb. 12, 1957 |
| 2,827,281 | Cooney | Mar. 18, 1958 |
| 2,940,552 | Freyler | June 14, 1960 |

FOREIGN PATENTS

| | | |
|---|---|---|
| 869,774 | France | Feb. 16, 1942 |